W. S. BRACKNEY.
FILM HOLDER.
APPLICATION FILED SEPT. 18, 1920.
1,422,029.
Patented July 4, 1922.
2 SHEETS—SHEET 1.
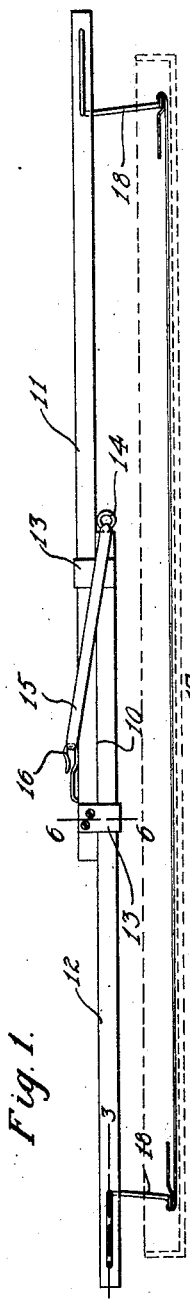
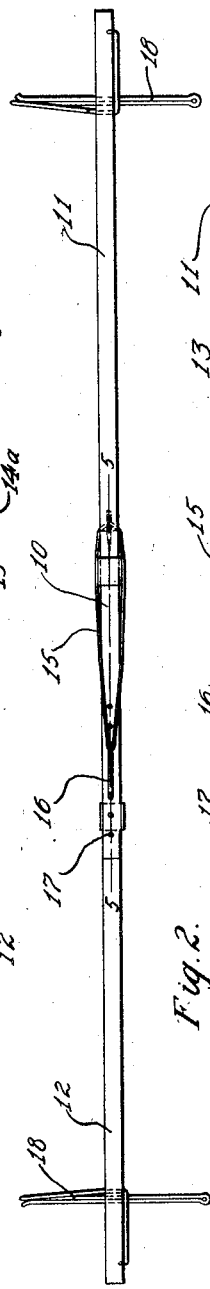
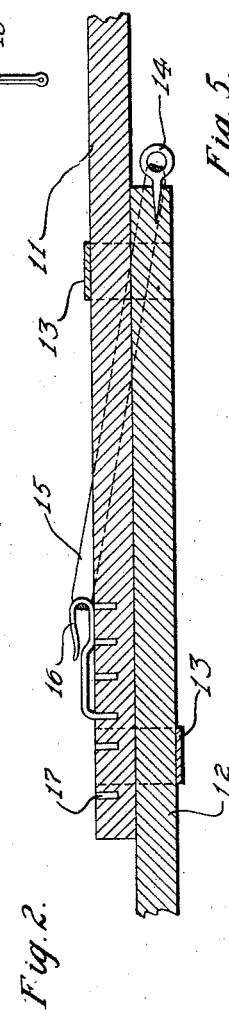
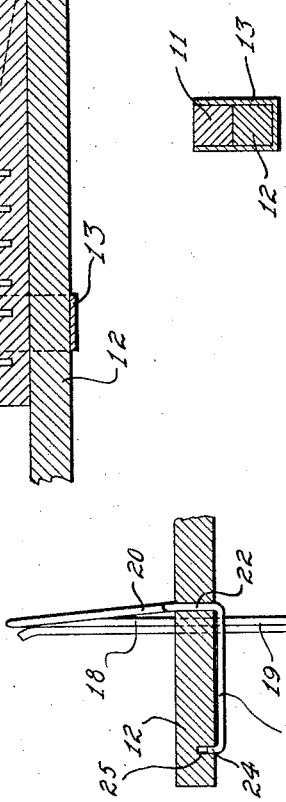
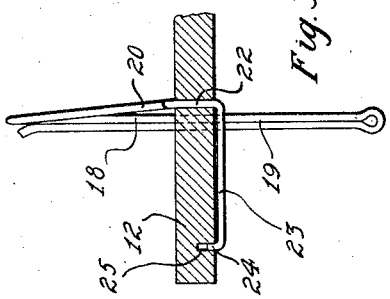
W. S. Brackney.
INVENTOR W. S. BRACKNEY.
FILM HOLDER.
APPLICATION FILED SEPT. 18, 1920.
1,422,029.
Patented July 4, 1922.
2 SHEETS—SHEET 2.
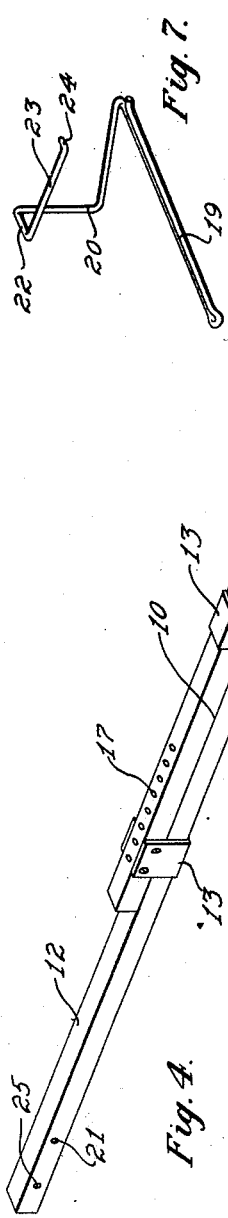
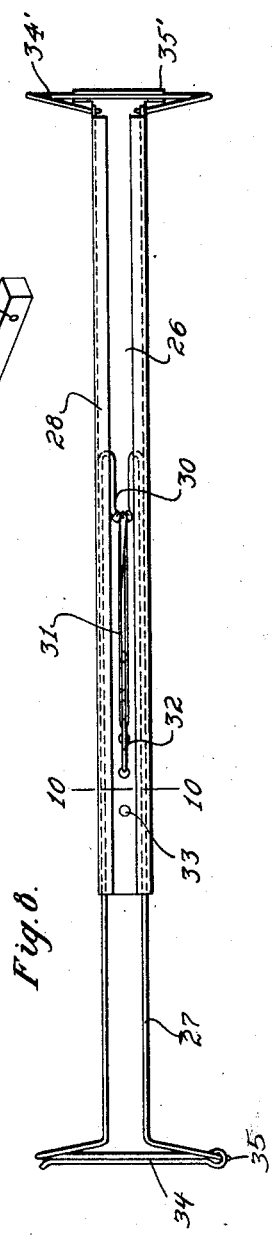
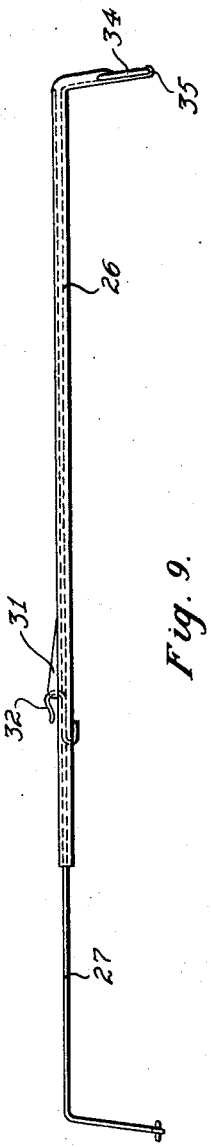
W. S. Brackney.
INVENTOR

UNITED STATES PATENT OFFICE.

WILLIAM S. BRACKNEY, OF ELIZABETHTON, TENNESSEE.

FILM HOLDER.

1,422,029. Specification of Letters Patent. Patented July 4, 1922.

Application filed September 18, 1920. Serial No. 411,073.

*To all whom it may concern:*

Be it known that I, WILLIAM S. BRACKNEY, a citizen of the United States, residing at Elizabethton, in the county of Carter and State of Tennessee, have invented new and useful Improvements in Film Holders, of which the following is a specification.

This invention relates to improvements in holders for camera films and has for an object the provision of a device by means of which films may be held in smooth condition in the bottom of a tray during the process of developing, fixing and washing the film and by means of which it may be afterward suspended for drying.

Another object is the provision of a film holder which will also provide means whereby the film may be handled without the hands of the operator coming in contact with the fluids or with the film during the process of developing, fixing and washing.

Another object is the provision of a device of this character which is of simple construction and which will hold films of different lengths.

Other objects and advantages of the invention will appear as the following description is read in connection with the accompanying drawings.

In the drawings:—

Figure 1 is a side elevation of a film holder with the film secured thereto, a tray being shown by dotted lines.

Figure 2 is a plan view of the film holder.

Figure 3 is an enlarged fragmentary longitudinal section on the line 3—3 of Figure 1.

Figure 4 is a detailed perspective view of the holder.

Figure 5 is an enlarged longitudinal sectional view taken through the adjacent ends of the extensible sections of the holder, the section being on the line 5—5 of Figure 2.

Figure 6 is a transverse section on the line 6—6 of Figure 1.

Figure 7 is a detailed perspective of one of the film engaging members.

Figure 8 is a plan view of a modified form of holder.

Figure 9 is a side elevation of the same.

Figure 10 is a transverse section on the line 10—10 of Figure 8.

Figure 11 is a fragmentary side elevation showing a modified means of securing the elastic member.

Referring to the drawings in detail, and more especially to Figures 1 to 7 inclusive, the holder illustrated in these views comprises a body member 10 which is formed of extensible sections 11 and 12, each section carrying a loop 13 through which the end of the other section slides. One of the sections, for example the section 12 is provided with an eye 14 for engagement with an elastic member 15, herein shown as rubber. The member 15 also engages a hook 16, the shank of which is adapted to be movably positioned in any one of a number of spaced openings 17 provided in the other member 11. By this means the adjacent ends of the sections 11 and 12 are adjustably and yieldably connected.

Each of the sections 11 and 12 is provided with a film engaging member 18 which is preferably formed of spring wire and comprises a loop 19 which is formed of substantially parallel arms provided by bending the spring wire upon itself and connecting the extremity of one of the arms with a portion 20 which forms a crank arm. The member 18 is pivotally mounted in an opening disposed transversely of each of the extensible members 11 and 12, the said opening being indicated at 21 and for this purpose the member 18 is formed with a transversely disposed portion 22. The member 18 is then bent substantially at right angles to provide an arm 23 whose end is formed into a hook 24 for detachable engagement in a socket 25 provided in each of the extensible members 11 and 12.

The film is secured to the holder by passing the ends around and between the parallel members of the loop 19 and the body portion of the holder may then be used as a handle and the film positioned within the pan as shown by the dotted lines in Figure 1, so that the hand of the operator will not come in contact with either the developing fluid or the sensitized portion of the film. After the film has been washed it may be suspended by means of the holder from a suitable hook for drying.

In Figures 8 to 10 inclusive, there is illustrated a modified form of holder which includes extensible sections 26 and 27, the former being formed of metal and provided along its edges with inwardly extending flanges 28 so as to provide grooves for the reception of the member 27 which is formed of wire and provided with spaced arms 29 which slide within the grooves provided by the flanges 28 so that the members are telescopically connected. The member 27 is provided with a loop 30 to which is secured an elastic element 31, the latter being also secured to the member 26 by means of a hook 32 which is detachably engaged in any one of a series of spaced openings 33. The members 26 and 27 are thus yieldingly and adjustably connected together after the manner of the members 11 and 12 of the first described form of the invention. One arm of the member 27 is provided with a looped bar 34 which receives the end of the film and which is adapted to engage a hook 35 provided upon the other arm of said member. This forms a clamp for receiving one end of the film so that the latter is held spaced from the body portion of the holder in substantially the same manner as in the previously described form of the invention.

In Figure 11 the expansible sections 11 and 12 are shown as being connected by an elastic member 15 such as is shown and described in connection with Figure 1. However, in this form of the invention, the elastic member is connected upon the side of the holder and for this purpose the sections 11 and 12 carry eyes 14ᵃ and 16ᵃ through which the elastic member is threaded. The eye 16ᵃ is removable after the manner of the hook 16 so as to permit it to be positioned in any one of a number of spaced openings 17ᵃ provided in the member 11. This permits the members 11 and 12 to be easily and adjustably connected.

The invention is susceptible of various changes in its form, proportions and minor details of construction and the right is herein reserved to make such changes as properly fall within the scope of the appended claims.

Having described the invention what is claimed is:—

1. A film holder comprising an elongated body portion and pivotally mounted spaced film engaging members extending laterally from said body portion for detachable engagement with a film.

2. A film holder comprising an elongated body portion, pivotally mounted spaced film engaging members extending from said body portion and means engageable with the body portion for holding the said members against pivotal movement.

3. A film holder comprising an elongated body portion having transverse openings therein, spaced film engaging members extending from said body portion, said members comprising substantially parallel spring arms, a pivoted portion positioned in one of the openings extending transversely of the body portion and a hook for removable engagement with another of the openings in the body portion.

4. A film holder comprising an extensible elongated member formed of separate sections, yieldable means connecting said sections in a manner to permit of relative sliding movement, means detachably connecting the yieldable means with the body member for adjusting the former and spaced means extending laterally from the elongated member for detachable engagement with a film.

In testimony whereof I affix my signature.

WILLIAM S. BRACKNEY.